United States Patent [19]

Lang

[11] Patent Number: 5,030,102
[45] Date of Patent: Jul. 9, 1991

[54] MOUNTING ARRANGEMENT FOR AN EXCHANGEABLE TOOTH IN AN ARTIFICIAL DENTAL JAW MODEL

[75] Inventor: Hans-Walter Lang, Leutkirch, Fed. Rep. of Germany

[73] Assignee: Kaltenbach & Voigt GmbH & Co., Biberach, Fed. Rep. of Germany

[21] Appl. No.: 445,379

[22] Filed: Dec. 4, 1989

[30] Foreign Application Priority Data

Dec. 21, 1988 [DE] Fed. Rep. of Germany ....... 3843106

[51] Int. Cl.⁵ ............................................. G09B 23/28
[52] U.S. Cl. ..................................... 434/263; 433/26; 433/193
[58] Field of Search .................. 434/263, 264; 433/26, 433/191, 192, 193, 194

[56] References Cited

U.S. PATENT DOCUMENTS

| | | | |
|---|---|---|---|
| 1,771,271 | 7/1930 | Pommer | 433/26 X |
| 1,854,720 | 4/1932 | Sprinkle | 433/26 |
| 1,948,059 | 2/1934 | Baugh | 434/263 |
| 2,669,779 | 2/1954 | Zuccoli | 433/193 |
| 3,458,936 | 8/1969 | Schulz et al. | 434/263 |
| 4,242,812 | 1/1981 | Randoll et al. | 434/263 |

*Primary Examiner*—Richard J. Apley
*Assistant Examiner*—J. L. Doyle
*Attorney, Agent, or Firm*—Scully, Scott, Murphy & Presser

[57] ABSTRACT

A mounting arrangement for a tooth in an artificial dental jaw model, especially in an artificial denture skull, and which is utilized for teaching and practice purposes. The tooth which is to be exchanged or replaced can be pulled out with an ordinary pair of extracting pliers and in an imitation of an actual extracting procedure, and the new tooth can be inserted with the application of a forcible or strong finger pressure.

18 Claims, 2 Drawing Sheets

MOUNTING ARRANGEMENT FOR AN EXCHANGEABLE TOOTH IN AN ARTIFICIAL DENTAL JAW MODEL

BACKGROUND OF THE INVENTION

1. Field of the Invention

The present invention relates to a mounting arrangement for a tooth in an artificial dental jaw model, especially in an artificial denture skull, and which is utilized for teaching and practice purposes.

2. Discussion of the Prior Art

An artificial denture skull of this type which is employed for teaching and practice purposes is known from the advertising brochures of the company J. Morita Europe, and "frasaco" of the company Franz Sachs & Co. GmbH Kunststoffverarbeitung.

In accordance with the last-mentioned company advertisement, the construction of the denture skull is generally as follows:

A model of a lower jaw is fastened onto a lower jaw mounting member through the intermediary of an anchoring screw, and a model of an upper jaw is similarly fastened to an articulator plate by means of an anchoring screw. In turn, the articulator plate is again fastened by means of an anchoring or locking screw to a lifting plate which is a component of an adjustable framework. The teeth are individually fastened through the use of screwthread connections in the applicable jaw models, whereby the screwthread connections are not accessible in the assembled condition.

When a tooth must be exchanged; for example, when it is worn down or has been damaged, then in a complicated and time consuming manner the applicable jaw model must be detached from the overall arrangement through loosening of its anchoring screw, whereupon only then will the screwthread connections of the individual teeth become accessible. The tooth which is to be exchanged must be disassembled from its screwthread connection and then removed. After the insertion of the new tooth, the installing procedure then takes place in a reverse sequence. This procedure entails a considerable loss of time, the latter of which is quite valuable in the training; for example, of students in dentistry.

SUMMARY OF THE INVENTION

The present invention, which pertains to a mounting arrangement for an exchangeable tooth in a model of an artificial dental jaw, especially an artificial denture skull which is employed for teaching and practice purposes, has as its primary object to create a mounting arrangement of the above-mentioned type in which, at a relatively low requirement on construction and time, it is possible to carry out a rapid exchanging or replacement of the teeth.

The achievable advantages of the invention can be ascertained herein, in that the tooth as well as the model of the jaw, can be simply assembled, and the tooth exchange or replacement can take place in an extremely time-saving manner. Thus, for example, the tooth which is to be exchanged or replaced can be pulled out with an ordinary pair of extracting pliers and in an imitation of an actual extracting procedure, and the new tooth can be inserted with the application of a forcible or strong finger pressure. Hereby, notwithstanding the simplicity in assembly and the rapidity of the procedure, there is afforded the obtention of a secure seating of the tooth in its specified position, and also during the subsequent treating procedure.

BRIEF DESCRIPTION OF THE DRAWINGS

Further features and advantages of the invention may now be readily ascertained from the following detailed description of exemplary embodiments of the invention, taken in conjunction with the accompanying drawings; in which:

FIG. 2b illustrates a sectional view taken along line IIb—IIb in FIG. 2a;

DETAILED DESCRIPTION

Figure 1:
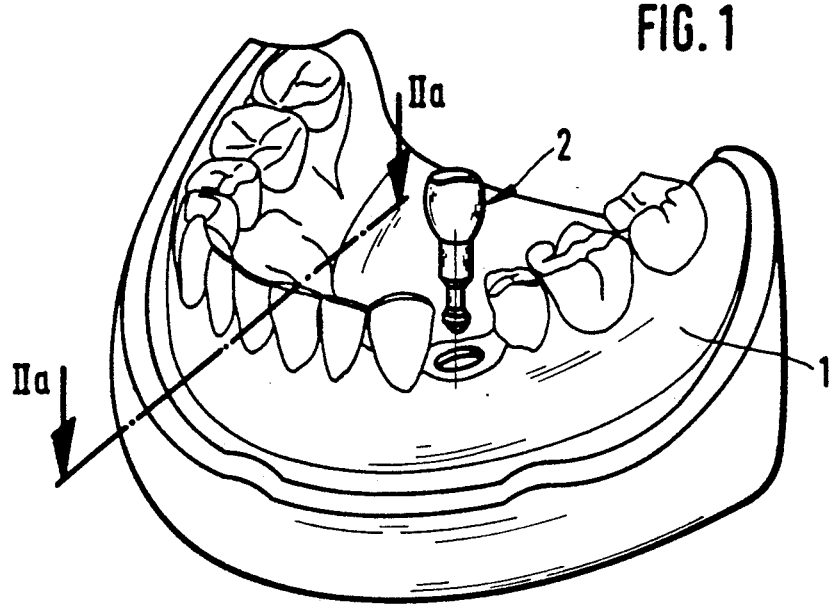
FIG. 1 illustrates a perspective view of a model of a lower jaw construction pursuant to the invention.

In FIG. 1 of the drawing, the reference numeral 1 designates a model of a lower jaw in which the invention has been incorporated; and reference numeral 2 identifies a tooth withdrawn from the model jaw.

Figure 2A:
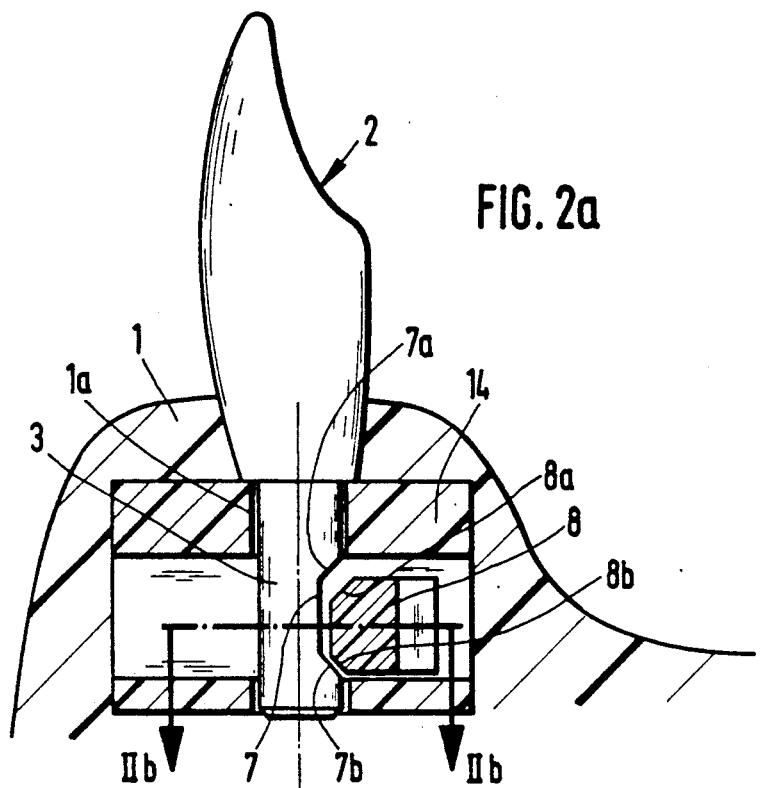
FIG. 2a illustrates, on an enlarged scale, a sectional view taken along line IIa—IIa in FIG. 1.
Figure 2B:
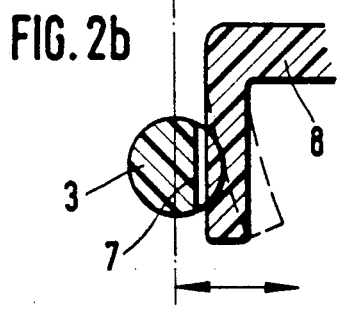

From FIG. 2a it can be ascertained that the tooth possesses a cylindrical shank 3, which is inserted into an appropriate or matching cutout 1a in the jaw model 1, and which by itself alone can already be retained through the elasticity of the material of the jaw model 1. However, this exemplary embodiment possesses a recess 7 on the cylindrical shank 3 with inclined or tapered side surfaces 7a, 7b. Engaging into this recess 7 is a vertically extending leaf spring 8 with inclined or tapered side surfaces 8a, 8b which are angled as shown in the sectional view of FIG. 2a. As shown in FIG. 2b, the leaf spring 8 is adapted to be bent or deflected in response to the pressure exerted thereon by the outer surface of shank 3 of a tooth 2 when the latter is lowered into place. The leaf ring can have such a angled in plan view. The leaf spring can have such a length along the side with which it engages into the recess 7 in the shank of a tooth 2, such as to bridge over the shanks 3 of a plurality of teeth 2 and to engage into their recesses 7. The leaf spring 8 can be inserted into, or integrated into the jaw model; for instance, such as by being positioned in an insert 14, and then cast together therewith into the jaw model. The tooth 2 is provided on the side thereof which is to be positioned on the jaw model 1 with a planar or flat contact surface 5.

Figure 3:
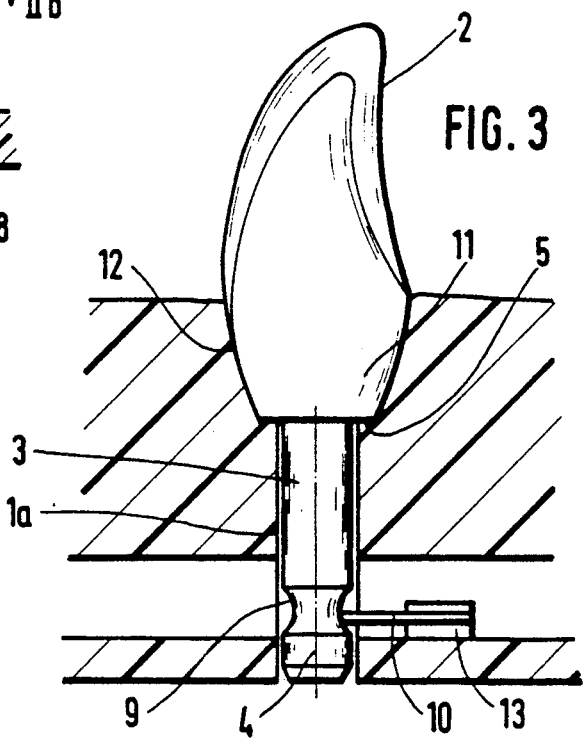
FIG. 3 illustrates a longitudinal sectional view, similar to that of FIG. 2a, through another embodiment of the invention.

Pursuant to FIG. 3, the leaf spring 10 is arranged horizontally and fastened at 13 in a usual manner. The leaf spring engages into an annularly extending or encompassing groove 9 formed in the shank 3, which in this instance is rounded off in cross-section. The tooth 2 has a conical configuration 11 on the part thereof which is to be inserted into the jaw model 1, and is seated in a conical cutout 12 in the jaw model 1.

Figure 4:
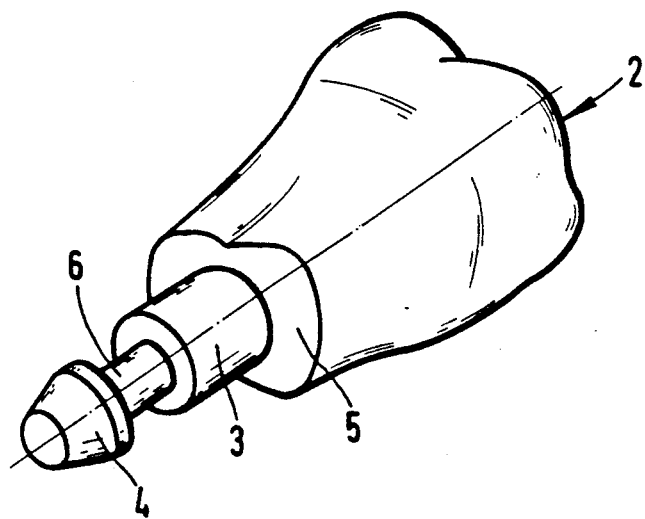
FIG. 4 illustrates a perspective view of a tooth which is constructed pursuant to a third exemplary embodiment.

In the embodiment pursuant to FIG. 4, in contrast with the foregoing, the groove 6 is bevelled.

Upon the pulling out of the tooth 2 which is to be replaced, the latter releases itself from the jaw model when it is retained by only the elasticity of the material of the jaw model 1. In the embodiments with elastic media, the tooth is released from engagement; for example, with the leaf spring 8, 10, and can be pulled out. The new tooth is inserted in a position conforming with nature into the cutout 1a in the jaw model 1, through exerting a forcible or strong finger pressure to push it into its final position, and there dependably maintained by means of the elastic media.

The end portion 4 of the shank 3 is formed as a depth or inserting stop for precise positioning of the tooth.

What is claimed is:

1. In a model for an artificial dental jaw having a replaceable tooth and a jaw model, a mounting arrangement for said replaceable tooth comprising said tooth having a cylindrical shank extending downwardly from the bottom thereof elastically retained in a recess formed in said jaw model, a leaf spring positioned in said jaw model for retaining said tooth in said jaw model, and a groove formed in the said shank, said leaf spring engaging into the groove in the shank for releasably engaging said tooth in said jaw model.

2. A mounting arrangement as claimed in claim 1, wherein said leaf spring has the surface expanse thereof arranged parallel to the longitudinal axis of the shank.

3. A mounting arrangement as claimed in claim 1, wherein the leaf spring is constituted of the material of the jaw model.

4. A mounting arrangement as claimed in claim 1, wherein an insert receives the leaf spring, said insert and said leaf spring therein being inserted into the jaw model.

5. A mounting arrangement as claimed in claim 4, wherein said leaf spring is cast into the jaw model with said insert.

6. A mounting arrangement as claimed in claim 1, wherein the leaf spring is a flat plate member.

7. A mounting arrangement as claimed in claim 6 wherein the leaf spring engages into the groove formed in the shank.

8. A mounting arrangement as claimed in claim 7, wherein said groove is an annular groove which is rounded off in cross-section.

9. A mounting arrangement as claimed in claim 1, wherein the leaf spring bridges over and retains the shanks of a plurality of said teeth.

10. A mounting arrangement as claimed in claim 1, wherein the end portion of the shank is conically tapered and planar on the end surface thereof.

11. A mounting arrangement as claimed in claim 1, wherein the tooth includes a planar stop surface for contacting against the upper surface of the jaw model.

12. A mounting arrangement as claimed in claim 1, wherein the tooth has a conical shape on the lower side thereof which is to be inserted into the jaw model, and is inserted into a conical cutout formed in the upper surface of the jaw model.

13. A mounting arrangement as claimed in claim 1, wherein said leaf spring has at least one tapered surface on a spring portion engaging into said groove in the shank.

14. A mounting arrangement as claimed in claim 13, wherein said tapered surface is formed on an upper edge of said leaf spring portion.

15. A mounting arrangement as claimed in claim 13, wherein said tapered surface is formed on a lower edge of said leaf spring portion.

16. A mounting arrangement as claimed in claim 13, wherein said leaf spring has tapered surfaces formed on upper and lower edges of a spring portion engaging into said groove in the tooth shank.

17. A mounting arrangement as claimed in claim 13, wherein said groove has a tapered side surface engageable by said leaf spring.

18. A mounting arrangement as claimed in claim 17, wherein said groove has opposing tapered side surfaces.

* * * * *